United States Patent
Choi et al.

(10) Patent No.: US 11,848,585 B2
(45) Date of Patent: Dec. 19, 2023

(54) ROTOR ASSEMBLY AND MOTOR INCLUDING THE SAME

(71) Applicant: HYUNDAI MOBIS CO., LTD., Seoul (KR)

(72) Inventors: Jin Woo Choi, Yongin-si (KR); Yeong Woo Seo, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 100 days.

(21) Appl. No.: 17/469,173

(22) Filed: Sep. 8, 2021

(65) Prior Publication Data
US 2022/0294294 A1    Sep. 15, 2022

(30) Foreign Application Priority Data

Mar. 10, 2021  (KR) .................. 10-2021-0031099

(51) Int. Cl.
*H02K 1/32*  (2006.01)
*H02K 9/19*  (2006.01)
*H02K 7/00*  (2006.01)
*H02K 5/20*  (2006.01)

(52) U.S. Cl.
CPC .............. *H02K 1/32* (2013.01); *H02K 5/20* (2013.01); *H02K 7/003* (2013.01); *H02K 9/19* (2013.01)

(58) Field of Classification Search
CPC ............ H02K 1/32; H02K 5/20; H02K 7/003; H02K 9/19; H02K 1/2766; H02K 1/22; H02K 9/02; H02K 9/22; H02K 5/15; Y02T 10/64
See application file for complete search history.

(56) References Cited

U.S. PATENT DOCUMENTS

| | | | |
|---|---|---|---|
| 2003/0205363 A1* | 11/2003 | Chu | H05K 7/20 |
| 2013/0241336 A1* | 9/2013 | Kottmyer | H02K 1/2773 |
| | | | 310/156.13 |
| 2019/0356187 A1* | 11/2019 | Fröhlich | H02K 1/32 |
| 2020/0036248 A1* | 1/2020 | Krais | H02K 1/32 |
| 2020/0328657 A1* | 10/2020 | Jung | H02K 9/19 |

FOREIGN PATENT DOCUMENTS

| | | |
|---|---|---|
| JP | 2002-325394 A | 11/2002 |
| JP | 2013-115848 A | 6/2013 |

OTHER PUBLICATIONS

Office Action issued in corresponding Korean Patent Application No. 10-2021-0031099 dated Dec. 8, 2022, with English translation.

\* cited by examiner

*Primary Examiner* — Tulsidas C Patel
*Assistant Examiner* — Mohammed Ahmed Qureshi
(74) *Attorney, Agent, or Firm* — MORGAN, LEWIS & BOCKIUS LLP (57) ABSTRACT

The present disclosure relates to a rotor assembly and a motor including the same. The rotor assembly according to the present disclosure includes a rotor core having a through-hole formed through a central portion thereof in an axial direction of the rotor core, and a rotor shaft that is coupled to the rotor core through the through-hole and that has a hollow into which a cooling fluid is introduced. A cooling fin protrudes from an inner circumferential surface of the rotor core toward the rotor shaft to form, between the rotor core and the rotor shaft, a rotor cooling channel through which the cooling fluid flows.

12 Claims, 12 Drawing Sheets

ROTOR ASSEMBLY AND MOTOR INCLUDING THE SAME

CROSS-REFERENCE TO RELATED APPLICATION

This application claims the benefit of priority to Korean Patent Application No. 10-2021-0031099, filed in the Korean Intellectual Property Office on Mar. 10, 2021, the entire contents of which are incorporated herein by reference.

TECHNICAL FIELD

The present disclosure relates to a rotor assembly and a motor including the same, and more particularly, relates to a rotor assembly for improving cooing efficiency of an oil-cooled motor and a motor including the rotor assembly.

BACKGROUND

Drive motors are configured to generate torque when power is applied thereto and have various structures. For example, a drive motor used for an electric vehicle may include a housing, a stator installed in the housing, and a rotor integrally coupled with a rotary shaft inside the stator. When a current is applied to a stator coil installed in the stator, an induced current is generated in the rotor, and the rotor rotates to generate torque.

Heat generating sources of the drive motor are the stator coil through which a current flows and a rotor core through which magnetic flux flows. When the temperatures of the corresponding parts are excessively raised during operation of the drive motor, function abnormality may occur. Therefore, it is important to cool heat generated from the motor.

A method of cooling heat generated from the motor includes an oil cooling method of directly supplying oil to the heat generating sources, a water cooling method of indirectly cooling the heat generating sources by allowing cooling water to flow in a housing channel, and the like.

In the oil cooling method, a pipe for supplying oil is installed in the housing, and the oil is released from the pipe to directly cool a stator core and the stator coil. The oil cooling method is advantageous in cooling the stator core and the stator coil, but has a limitation in directly cooling the rotor core. Accordingly, a structure capable of effectively cooling the rotor core in the oil cooling method is required.

SUMMARY

The present disclosure has been made to solve the above-mentioned problems occurring in the prior art while advantages achieved by the prior art are maintained intact.

An aspect of the present disclosure provides a rotor assembly for improving cooling performance by implementing a structure directly cooling a rotor core even in an oil cooling method by forming, between a rotor shaft and the rotor core, a rotor cooling channel through which a cooling fluid flows, and a motor including the rotor assembly.

Another aspect of the present disclosure provides a rotor assembly for preventing rotation of a rotor core using a cooling fin and improving cooling performance of the rotor core by increasing the amount of transferred heat by increasing a flow passage area of a rotor cooling channel using a fin-shape of the cooling fin, and a motor including the rotor assembly.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a rotor assembly includes a rotor core having a through-hole formed through a central portion thereof in an axial direction of the rotor core, and a rotor shaft that is coupled to the rotor core through the through-hole and that has a hollow into which a cooling fluid is introduced. A cooling fin protrudes from an inner circumferential surface of the rotor core toward the rotor shaft to form, between the rotor core and the rotor shaft, a rotor cooling channel through which the cooling fluid flows.

The rotor shaft may include a shaft body having the hollow formed therein, an anti-rotation surface formed in a planar shape on at least part of an outer surface of the shaft body, and a cooling fluid hole penetrating through the shaft body and connecting the hollow and the anti-rotation surface to each other, the cooling fluid hole being formed on the anti-rotation surface. The cooling fin may be formed in a position corresponding to the anti-rotation surface.

The anti-rotation surface may include a pair of anti-rotation surfaces that extend along the axial direction and that are located on an outer circumferential surface of the shaft body to face each other, and the cooling fin may extend along the axial direction.

A lengthwise direction of the anti-rotation surface may be referred to as a first direction, and a widthwise direction of the anti-rotation surface may be referred to as a second direction, the second direction being perpendicular to the first direction. The cooling fin may include an anti-rotation fin having an end portion that faces toward the anti-rotation surface and makes contact with the anti-rotation surface and a flow passage fin spaced apart from the anti-rotation fin in the second direction and spaced apart from the anti-rotation surface.

The cooling fluid hole may include a first fluid hole and a second fluid hole formed in a position spaced apart from the first fluid hole in the second direction. The anti-rotation fin may be configured such that the end portion is located between the first fluid hole and the second fluid hole.

The flow passage fin may include a plurality of first flow passage fins that are located on one side of the anti-rotation fin in the second direction and that form a first cooling channel connected with the first fluid hole and a plurality of second flow passage fins that are located on an opposite side of the anti-rotation fin in the second direction and that form a second cooling channel connected with the second fluid hole.

A contact protrusion having a spline shape may be formed on outer surfaces of the anti-rotation fin and the flow passage fin.

The contact protrusion may extend in the first direction, and a cross-section of the contact protrusion that is perpendicular to the anti-rotation surface may have a triangular saw tooth shape.

The flow passage fin may have a thickness smaller than a thickness of the anti-rotation fin in the second direction.

The rotor assembly may further include end plates that cover one side surface and an opposite side surface of the rotor core in the axial direction, and the rotor shaft may pass through the end plates.

The end plates may include a first end plate that covers the one side surface of the rotor core and a second end plate that covers the opposite side surface of the rotor core.

The second end plate may have a fluid discharge groove formed thereon, the fluid discharge groove being located between the rotor core and the second end plate and connected with the rotor cooling channel such that the cooling fluid flowing through the rotor cooling channel is discharged outside the rotor core.

According to another aspect of the present disclosure, a motor includes a housing, a stator disposed in the housing, and a rotor assembly received inside the stator so as to be rotatable. The rotor assembly includes a rotor core having a through-hole formed through a central portion thereof in an axial direction of the rotor core, and a rotor shaft that is coupled to the rotor core through the through-hole and that has a hollow into which a cooling fluid is introduced. The rotor core includes a cooling fin protruding from an inner circumferential surface thereof to form, between the rotor core and the rotor shaft, a rotor cooling channel through which the cooling fluid flows.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

The following embodiments are embodiments appropriate for the understanding of technical features of a rotor assembly and a motor including the same according to the present disclosure. However, the present disclosure is not restrictively applied to the embodiments to be described below, and technical features of the present disclosure are not limited by the embodiments to be described. Furthermore, various changes and modifications can be made without departing from the spirit and scope of the present disclosure.

Figure 1:
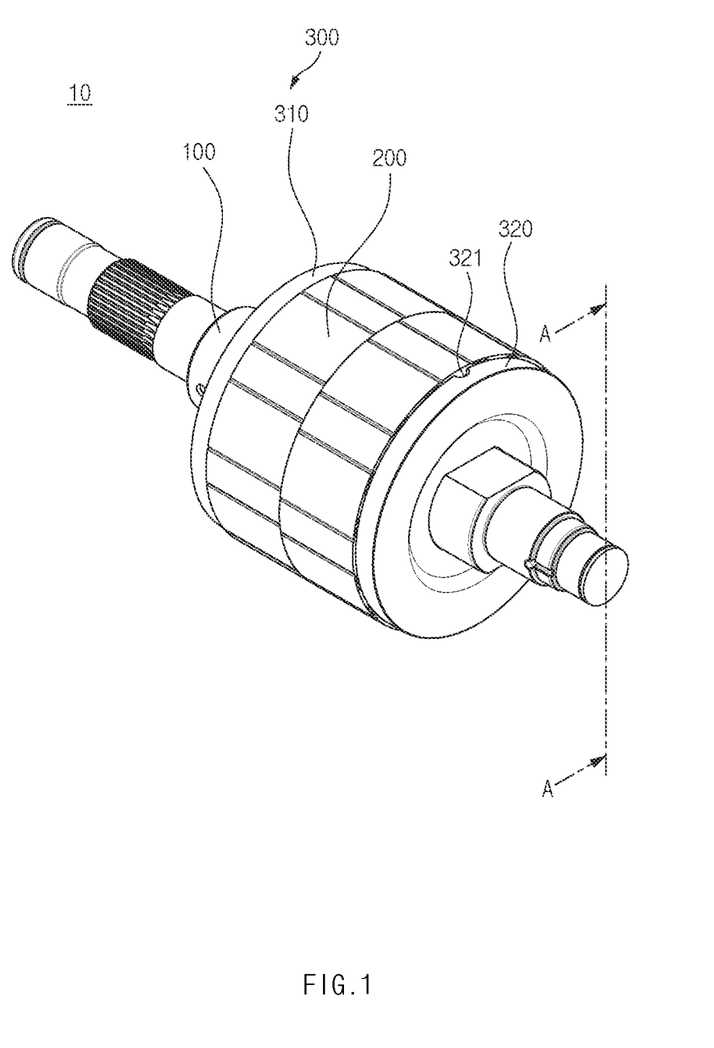
FIG. 1 is a perspective view illustrating a rotor assembly according to an embodiment of the present disclosure.
Figure 2:
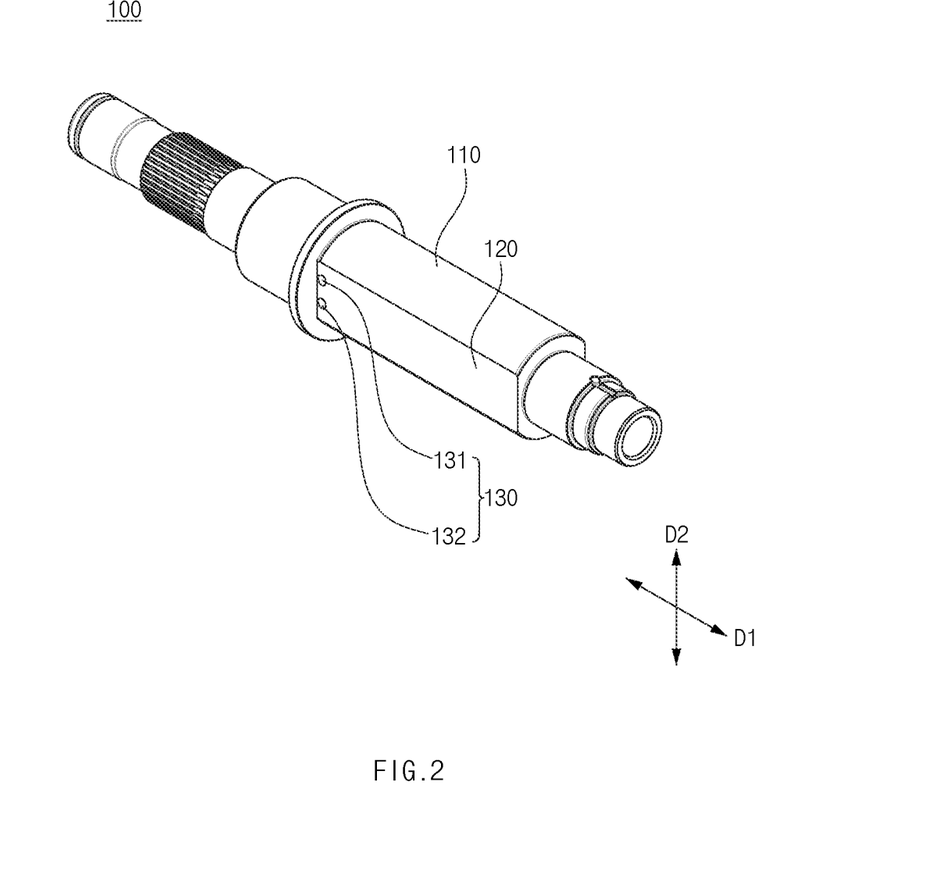
FIG. 2 is a perspective view illustrating a rotor shaft according to an embodiment of the present disclosure.
Figure 3:
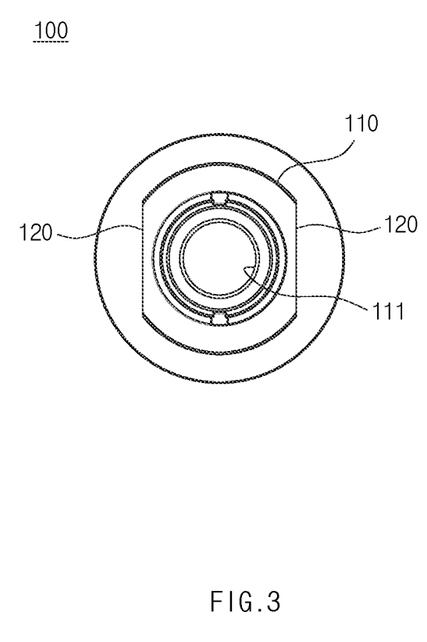
FIG. 3 is a front view of the rotor shaft according to the embodiment of the present disclosure illustrated in FIG. 2.
Figure 4:
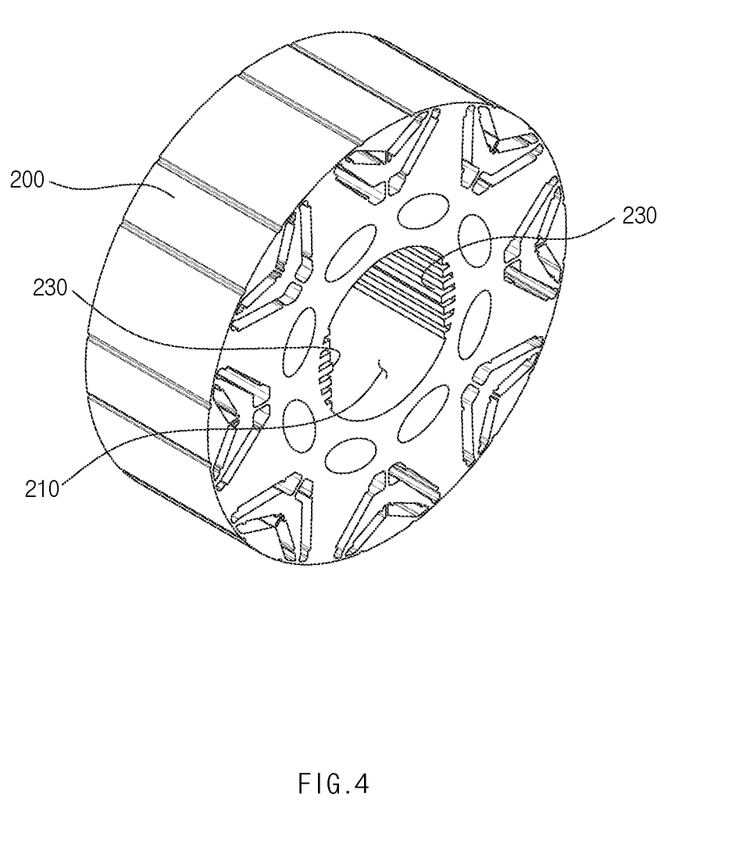
FIG. 4 is a perspective view illustrating a rotor core according to a first embodiment of the present disclosure.
Figure 5:
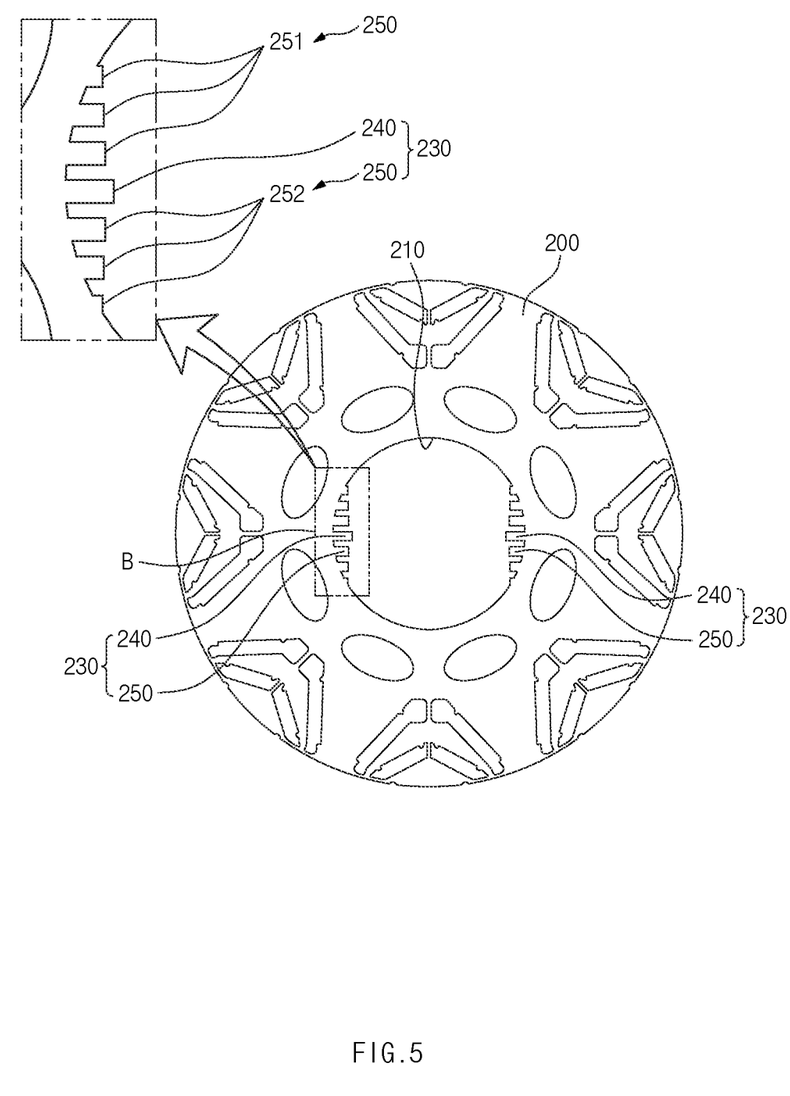
FIG. 5 illustrates a front view and a partial enlarged view of the rotor core according to the first embodiment of the present disclosure illustrated in FIG. 4.
Figure 6:
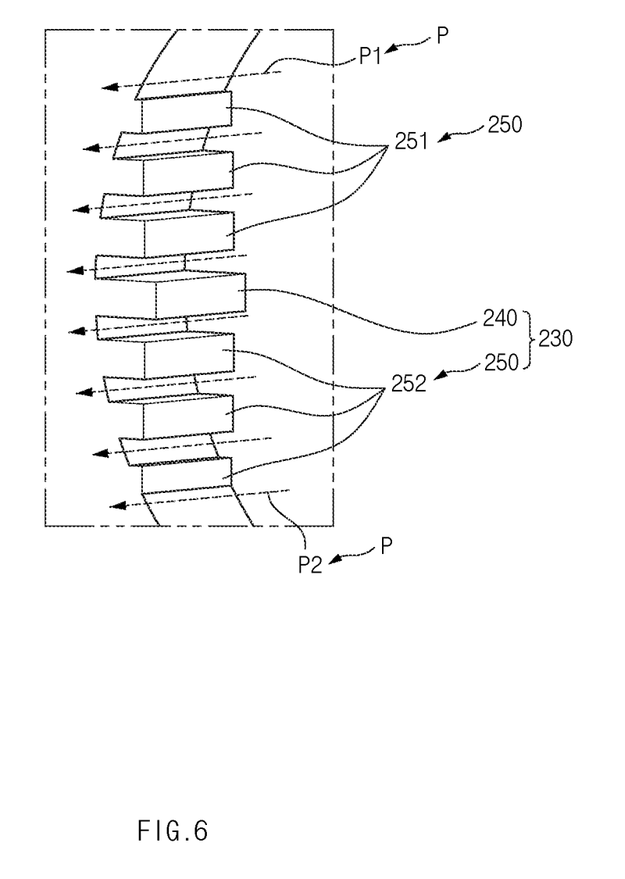
FIG. 6 is a partial enlarged perspective view of portion B in FIG. 5.
Figure 7:
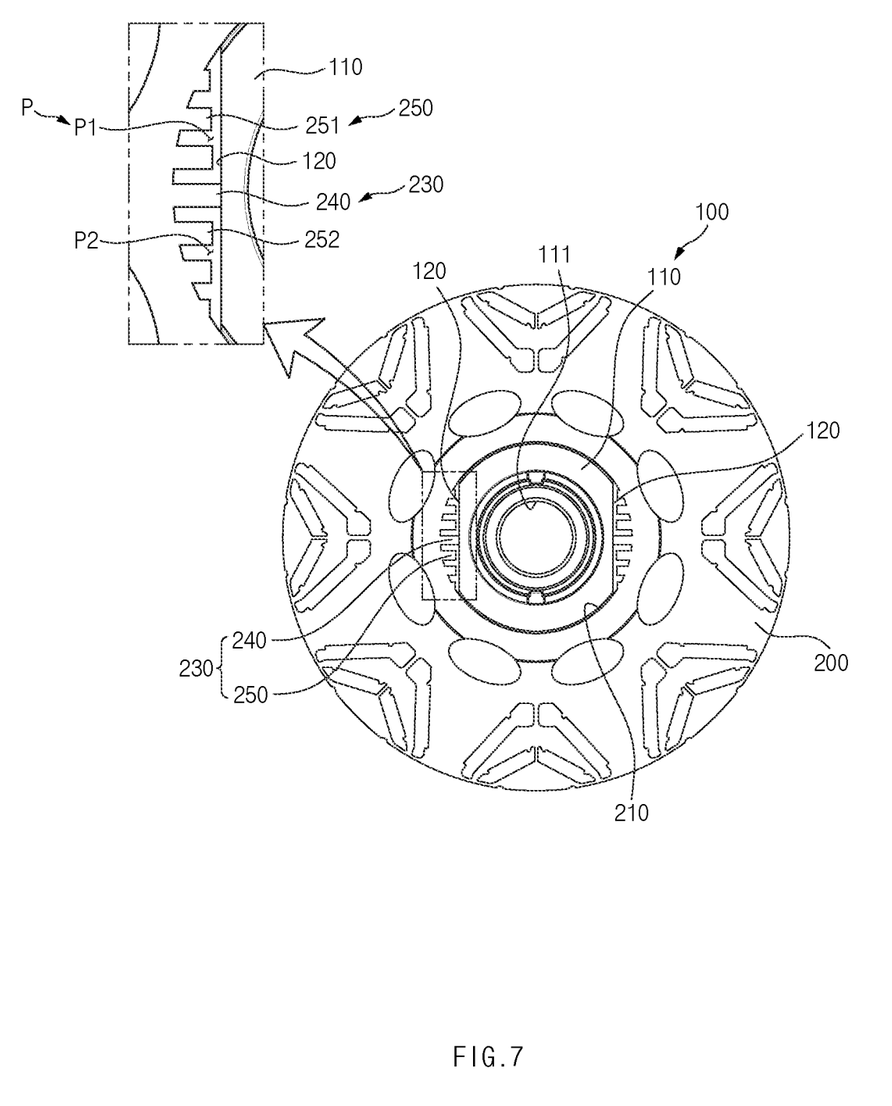
FIG. 7 is a front view illustrating a state in which the rotor core and the rotor shaft are coupled according to an embodiment of the present disclosure.
Figure 8:
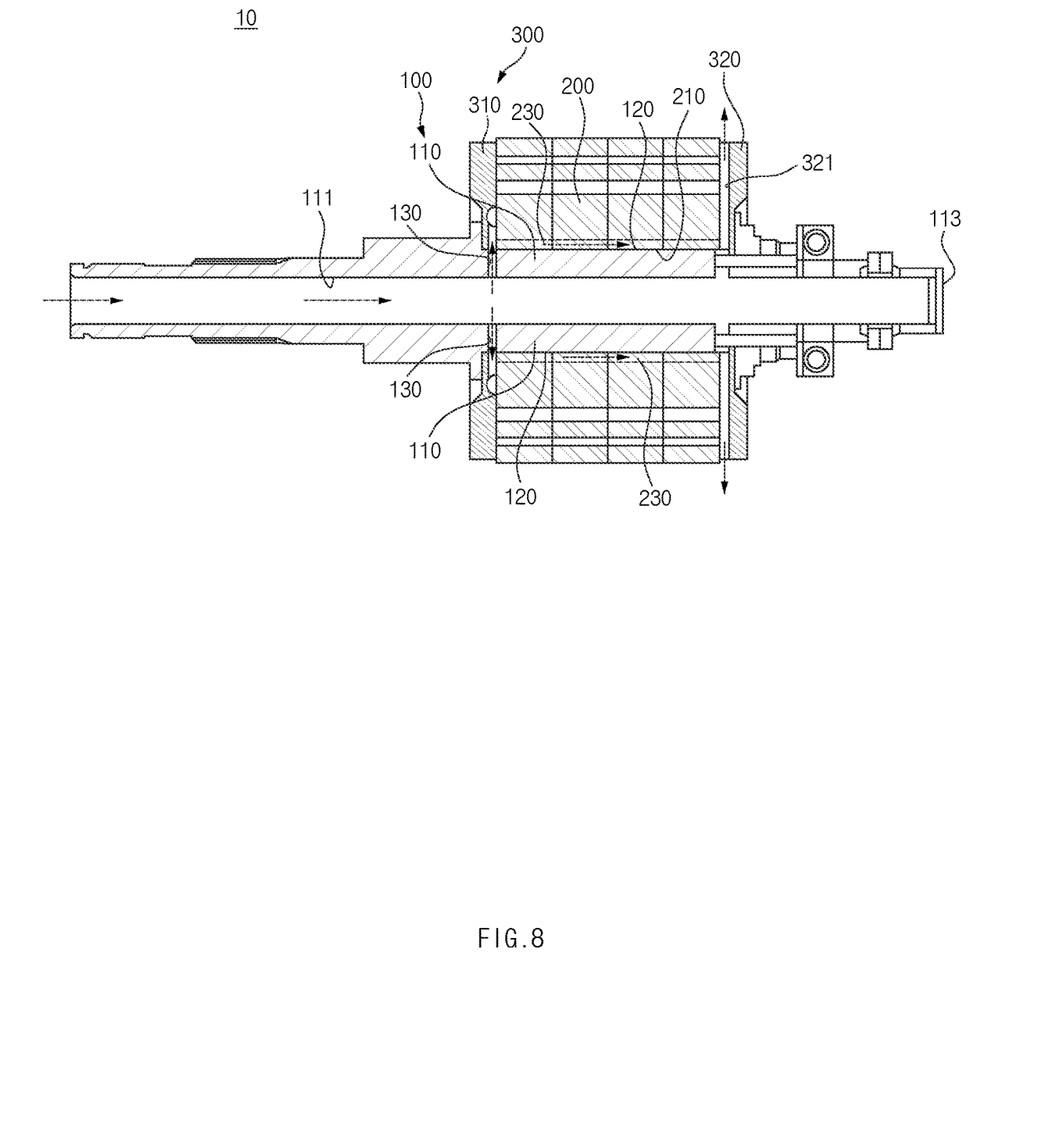
FIG. 8 is a sectional view taken along line A-A of FIG. 1.

FIG. 1 is a perspective view illustrating a rotor assembly according to an embodiment of the present disclosure. FIG. 2 is a perspective view illustrating a rotor shaft according to an embodiment of the present disclosure. FIG. 3 is a front view of the rotor shaft according to the embodiment of the present disclosure illustrated in FIG. 2. FIG. 4 is a perspective view illustrating a rotor core according to a first embodiment of the present disclosure. FIG. 5 illustrates a front view and a partial enlarged view of the rotor core according to the first embodiment of the present disclosure illustrated in FIG. 4. FIG. 6 is a partial enlarged perspective view of portion B in FIG. 5. FIG. 7 is a front view illustrating a state in which the rotor core and the rotor shaft are coupled according to an embodiment of the present disclosure. FIG. 8 is a sectional view taken along line A-A of FIG. 1.

Figure 9:
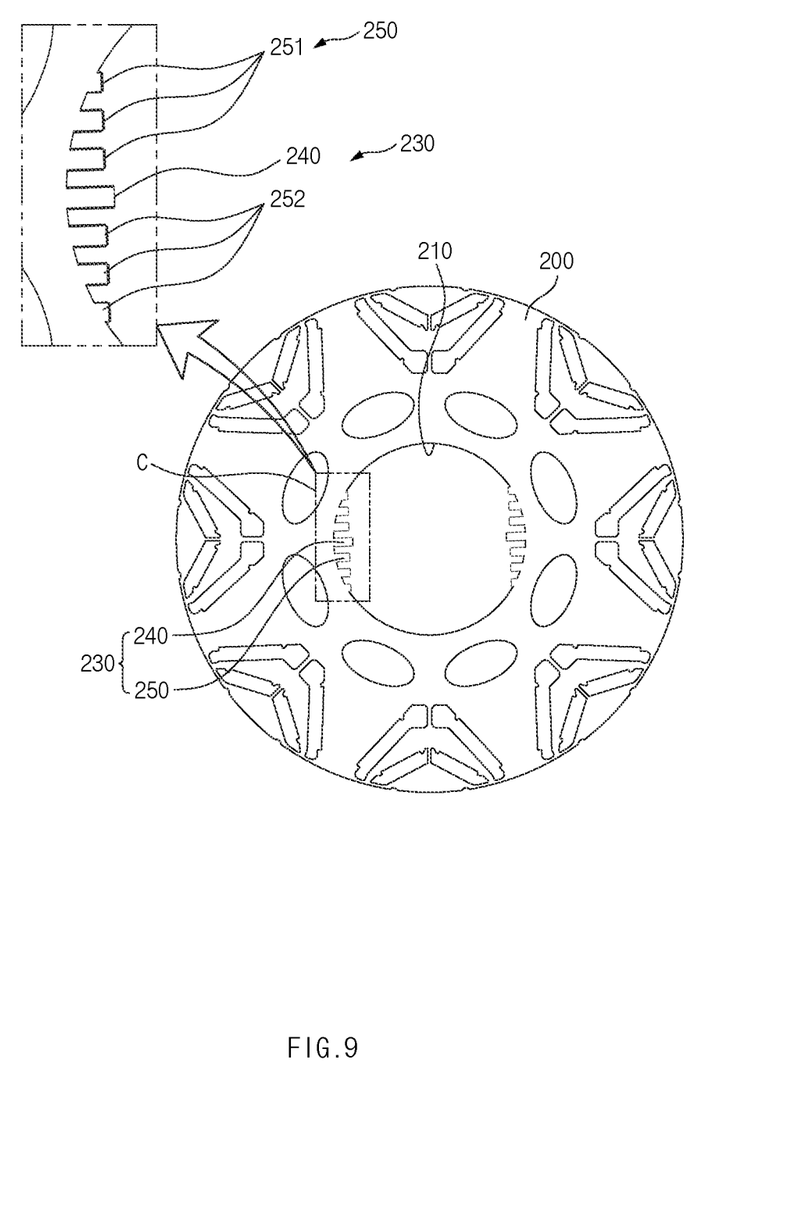
FIG. 9 illustrates a front view and a partial enlarged view of a rotor core according to a second embodiment of the present disclosure.
Figure 10:
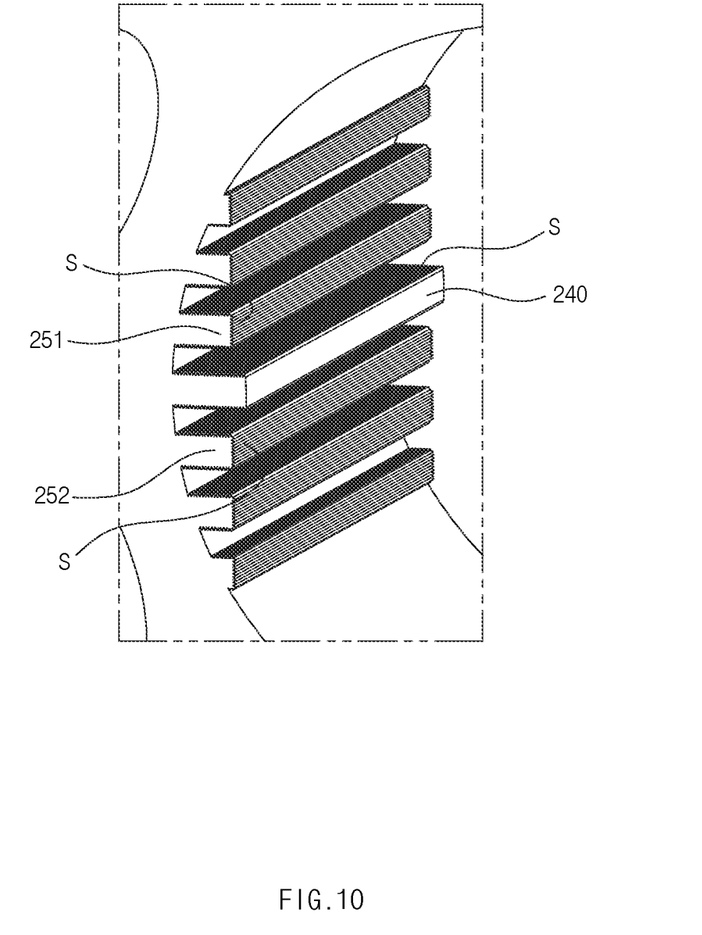
FIG. 10 is a partial enlarged perspective view of portion C in FIG. 9.
Figure 11:
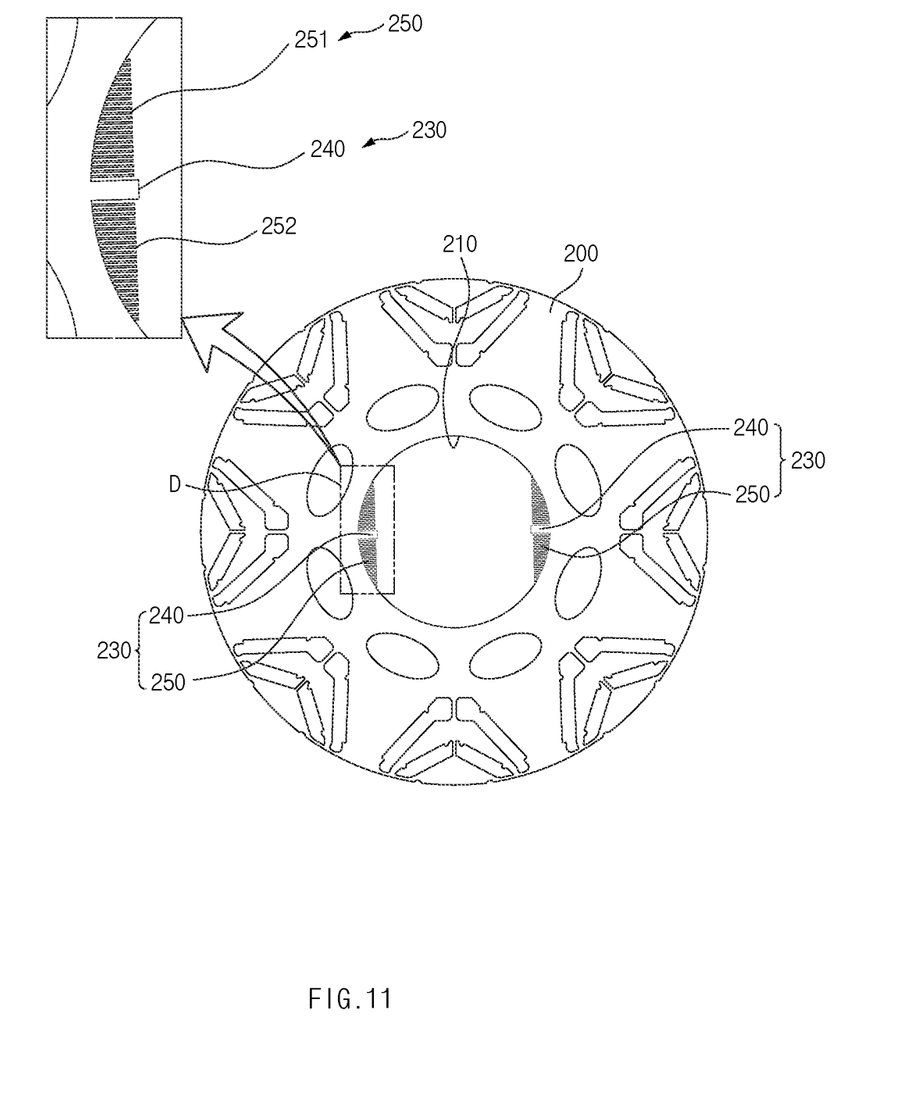
FIG. 11 illustrates a front view and a partial enlarged view of a rotor core according to a third embodiment of the present disclosure.
Figure 12:
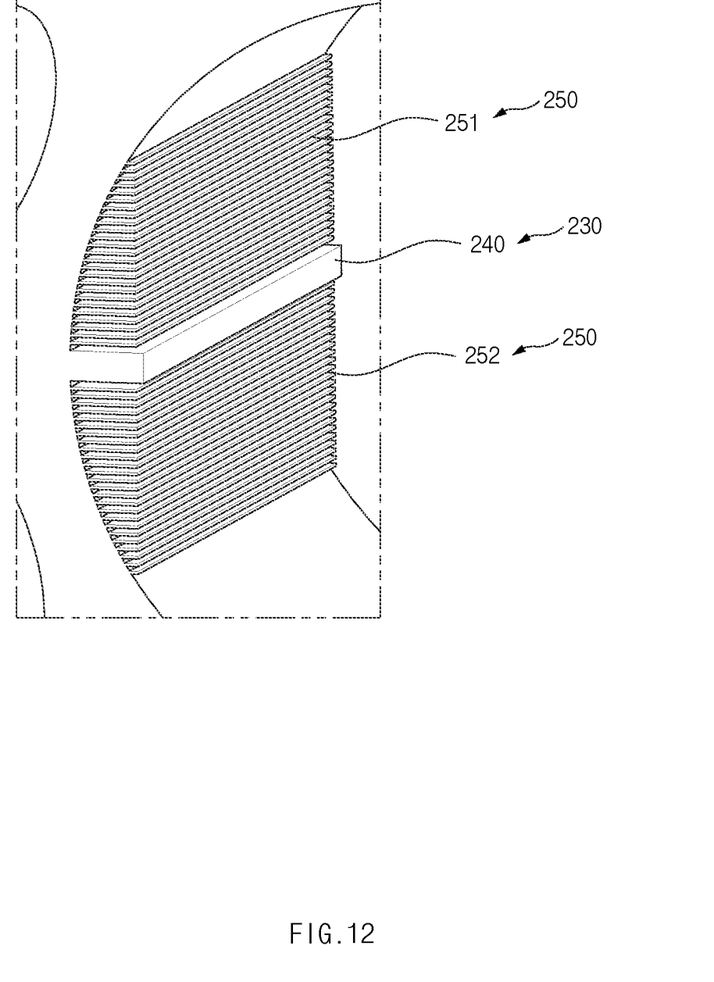
FIG. 12 is a partial enlarged perspective view of portion D in FIG. 11.

FIG. 9 illustrates a front view and a partial enlarged view of a rotor core according to a second embodiment of the present disclosure. FIG. 10 is a partial enlarged perspective view of portion C in FIG. 9. FIG. 11 illustrates a front view and a partial enlarged view of a rotor core according to a third embodiment of the present disclosure. FIG. 12 is a partial enlarged perspective view of portion D in FIG. 11.

A motor according to an embodiment of the present disclosure may include a housing (not illustrated), a stator (not illustrated), and the rotor assembly 10.

The housing may have a space formed therein, and a plurality of parts may be installed in the space of the housing.

The stator may be disposed in the interior space of the housing, and the rotor assembly 10 may be received inside the stator so as to be rotatable.

For example, the stator may be fixedly installed in the housing. The stator may include a wound coil, and the coil may be magnetized when power is applied thereto.

The rotor assembly 10 may be installed inside the stator so as to be rotatable. An induced current may be generated in the rotor assembly 10, and the rotor assembly 10 may be rotated relative to the stator by the induced current.

Hereinafter, the rotor assembly 10 according to the embodiment of the present disclosure will be described with reference to FIGS. 1 to 12.

Referring to FIGS. 1 to 12, the rotor assembly 10 according to the embodiment of the present disclosure may include the rotor core 200 and the rotor shaft 100.

The rotor core 200 may have a through-hole 210 formed through a central portion thereof in a lengthwise direction. When a current is applied to the stator coil, an induced current may be generated, and the rotor core 200 may be rotated.

The rotor shaft 100 may be coupled to the rotor core 200 through the through-hole 210 and may have a hollow 111 into which a cooling fluid is introduced.

Specifically, the rotor shaft 100 may be integrally coupled with the rotor core 200 and may rotate together with the rotor core 200. The rotor shaft 100 may be formed in the form of a hollow shaft having a hollow formed therein, and the hollow 111 may be filled with the cooling fluid. For example, lubricant oil for a speed reducer bearing provided in the housing may be supplied into the hollow 111 of the rotor shaft 100 as the cooling fluid. However, the type and the inflow path of the cooling fluid supplied into the hollow 111 are not limited thereto.

More specifically, the rotor shaft 100 may include a shaft body 110, an anti-rotation surface 120, and a cooling fluid hole 130.

The shaft body 110 may have the hollow 111 formed therein, and the hollow 111 may extend along the central axis of the shaft body 110. One side of the shaft body 110 in the lengthwise direction may be connected with a cooling fluid supply source, and an opposite side of the shaft body 110 in the lengthwise direction may be covered by an oil cap 113 to prevent leakage of the cooling fluid.

The anti-rotation surface 120 may be formed in a planar shape on at least part of an outer surface of the shaft body 110.

For example, the anti-rotation surface 120 may be implemented as a flat surface by machining the shaft body 110 in the shape of "D" in a cross-section perpendicular to the central axis of the shaft body 110. The anti-rotation surface 120 may include a pair of anti-rotation surfaces 120 that extend along the lengthwise direction of the shaft body 110 and that are located on an outer circumferential surface of the shaft body 110 to face each other. However, the shape, positions, and number of anti-rotation surfaces 120 are not limited thereto.

The cooling fluid hole 130 may be formed through the shaft body 110 to connect the hollow 111 and the anti-rotation surface 120 and may be formed in a position corresponding to the anti-rotation surface 120.

Specifically, the cooling fluid hole 130 may be formed through the shaft body 110 in a direction from the hollow 111 toward the anti-rotation surface 120 and may form a channel through which the cooling fluid is released. The cooling fluid may be introduced into the hollow 111 and may be supplied between the shaft body 110 and the rotor core 200 through the cooling fluid hole 130. For example, as in the illustrated embodiment, the cooling fluid hole 130 may be formed in a position corresponding to one end portion of the rotor core 200 in the lengthwise direction.

A cooling fin 230 may protrude from an inner circumferential surface of the rotor core 200 toward the rotor shaft 100 to form, between the rotor core 200 and the rotor shaft 100, a rotor cooling channel P through which the cooling fluid flows.

The cooling fin 230 may be formed in a position corresponding to the anti-rotation surface 120. Furthermore, the cooling fin 230 may extend along the lengthwise direction of the anti-rotation surface 120. Accordingly, the rotor cooling channel P extending in the lengthwise direction of the anti-rotation surface 120 may be formed between the cooling fin 230 and the anti-rotation surface 120. The cooling fluid released through the cooling fluid hole 130 may directly cool the rotor core 200 while flowing through the rotor cooling channel P.

Furthermore, rotation of the rotor core 200 relative to the rotor shaft 100 may be prevented by the structure in which the anti-rotation surface 120 is formed in a planar shape and the cooling fin 230 protrudes toward the anti-rotation surface 120. That is, the rotor core 200 and the rotor shaft 100 may be rotated together by the structure.

As described above, in the rotor assembly 10 and the motor including the same according to the embodiment of the present disclosure, the rotor shaft 100 may have the anti-rotation surface 120 formed thereon, the rotor core 200 may have the cooling fin 230 formed on the inner surface thereof, and the rotor cooling channel P through which the cooling fluid flows may be formed between the rotor shaft 100 and the rotor core 200 to directly cool the rotor core 200 in an oil cooling method. Accordingly, the cooling performance of the motor may be improved.

In addition, according to the embodiment of the present disclosure, the cooling fin 230 may prevent rotation of the rotor core 200, and the fin shape of the cooling fin 230 may increase the flow passage area of the rotor cooling channel P to increase the amount of heat transferred, thereby improving the cooling performance of the rotor core 200.

Hereinafter, for convenience of description, the lengthwise direction of the anti-rotation surface 120 is referred to as the first direction D1, and the widthwise direction of the anti-rotation surface 120 is referred to as the second direction D2, the second direction D2 being perpendicular to the first direction D1 (refer to FIG. 2). The lengthwise direction of the anti-rotation surface 120 may be parallel to an axial direction of the shaft body 110 or an axial direction of the rotor core 200. The first and second directions may be parallel to the anti-rotation surface 120.

The cooling fin 230 may include an anti-rotation fin 240 and flow passage fins 250.

The anti-rotation fin 240 may be provided such that an end portion facing toward the anti-rotation surface 120 makes contact with the anti-rotation surface 120 (refer to FIG. 7). The flow passage fins 250 may be spaced apart from the anti-rotation fin 240 in the second direction and may be spaced apart from the anti-rotation surface 120 (refer to FIGS. 4 to 12).

Specifically, the anti-rotation fin 240 is a member that makes contact with the anti-rotation surface 120 to prevent rotation of the rotor core 200. For example, the anti-rotation fin 240 may be located in the center of the cooling fin 230 in the second direction. Furthermore, an end surface of the anti-rotation fin 240 that faces toward the anti-rotation surface 120 may be formed to be flat so as to correspond to the anti-rotation surface 120 and may make surface-to-surface contact with the anti-rotation surface 120 to effectively prevent rotation of the rotor core 200. However, the end surface of the anti-rotation fin 240 is not limited thereto.

The flow passage fins 250 for forming the rotor cooling channel P together with the anti-rotation fin 240 may increase the surface area of the rotor core 200 for cooling.

For example, the cooling fluid hole 130 may include a first fluid hole 131 and a second fluid hole 132 formed in a position spaced apart from the first fluid hole 131 in the second direction. The anti-rotation fin 240 may be provided such that the end portion making contact with the anti-rotation surface 120 is located between the first fluid hole 131 and the second fluid hole 132. However, the number of cooling fluid holes 130 and the positional relationship between the cooling fluid hole 130 and the anti-rotation fin 240 are not limited thereto and may be modified in various ways as long as the rotor cooling channel P is able to be formed.

For example, the flow passage fins 250 may include first flow passage fins 251 and second flow passage fins 252 distinguished from each other with respect to the anti-rotation fin 240.

The first flow passage fins 251 may be located on one side of the anti-rotation fin 240 in the second direction and may form a first cooling channel P1 connected with the first fluid hole 131. The second flow passage fins 252 may be located on an opposite side of the anti-rotation fin 240 in the second direction and may form a second cooling channel P2 connected with the second fluid hole 132.

The numbers and sizes of first flow passage fins 251 and second flow passage fins 252 are not limited to the illustrated embodiment. The first flow passage fins 251 and the second flow passage fins 252 may have a different size from the anti-rotation fin 240, and the numbers of first flow passage fins 251 and second flow passage fins 252 may be variously changed depending on installation environments. Likewise to the anti-rotation fin 240, the first flow passage fins 251 and the second flow passage fins 252 may extend in the first direction.

Specifically, the plurality of first flow passage fins 251 may be spaced apart from each other in the second direction. To form the first cooling channel P1 through which the cooling fluid flows, the first flow passage fins 251 may be spaced apart from the anti-rotation fin 240 and may be spaced apart from each other. The cooling fluid introduced into the hollow 111 may move to the first cooling channel P1 through the first fluid hole 131. As the first flow passage fins 251 are spaced apart from the anti-rotation surface 120, the cooling fluid released through the first fluid hole 131 may be supplied between the first flow passage fins 251 and the anti-rotation fin 240 and between the plurality of first flow passage fins 251.

The plurality of second flow passage fins 252 may be spaced apart from each other in the second direction. To form the second cooling channel P2 through which the cooling fluid flows, the second flow passage fins 252 may be spaced apart from the anti-rotation fin 240 and may be spaced apart from each other. The cooling fluid introduced into the hollow 111 may move to the second cooling channel P2 through the second fluid hole 132. As the second flow passage fins 252 are spaced apart from the anti-rotation surface 120, the cooling fluid released through the second fluid hole 132 may be supplied between the second flow passage fins 252 and the anti-rotation fin 240 and between the plurality of second flow passage fins 252. The rotor cooling channel P may be implemented by the first cooling channel P1 and the second cooling channel P2.

The first cooling channel P1 and the second cooling channel P2 may extend from one end portion of the rotor core 200 to an opposite end portion thereof. The cooling fluid released outside the rotor shaft 100 through the cooling fluid hole 130 may directly cool the rotor core 200 while moving in the first direction through the first cooling channel P1 and the second cooling channel P2. Because the plurality of first flow passage fins 251 and the plurality of second flow passage fins 252 are provided, the contact area between the cooling fin 230 and the cooling fluid may be increased, and thus cooling efficiency may be improved.

Meanwhile, the anti-rotation fin 240 and the flow passage fins 250 may be modified in various forms to increase the area of contact with the cooling fluid flowing through the rotor cooling channel P. For example, the rotor core 200 according to the first embodiment of the present disclosure is illustrated in FIGS. 4 to 7, the rotor core 200 according to the second embodiment of the present disclosure is illustrated in FIGS. 9 and 10, and the rotor core 200 according to the third embodiment of the present disclosure is illustrated in FIGS. 11 and 12. However, the shapes of the rotor cores 200 are not limited to the illustrated embodiments and may be modified in various ways.

Referring to FIGS. 4 to 7, in the case of the rotor core 200 according to the first embodiment of the present disclosure, the flow passage fins 250 may have the same thickness as the anti-rotation fin 240 in the second direction. However, the thicknesses of the anti-rotation fin 240 and the flow passage fins 250 are not limited to the above-described embodiment.

Referring to FIGS. 9 and 10, in the case of the rotor core 200 according to the second embodiment of the present disclosure, contact protrusions S having a spline shape may be formed on outer surfaces of an anti-rotation fin 240 and flow passage fins 250.

Specifically, the contact protrusions S may be formed on the outer surfaces of the flow passage fins 250 and the anti-rotation fin 240 that make contact with a cooling fluid. The contact protrusions S may extend in the first direction. Some of the contact protrusions S may protrude in directions in which the flow passage fins 250 and the anti-rotation fin 240 face each other or in directions in which the adjacent flow passage fins 250 face each other. Furthermore, the rest of the contact protrusions S (e.g., the contact protrusions S protruding from surfaces of the flow passage fins 250 that face toward the anti-rotation fin 240) may protrude toward an anti-rotation surface 120. The contact protrusions S may be implemented in a spline shape on the outer surfaces of the flow passage fins 250 and the anti-rotation fin 240 by the structure.

For example, the contact protrusions S may extend in the first direction, and the cross-sections of the contact protrusions S that are perpendicular to the anti-rotation surface 120 may have a triangular saw tooth shape. Accordingly, the contact protrusions S may increase the surface areas of the flow passage fins 250 and the anti-rotation fin 240 without hampering a flow of the cooling fluid. The contact protrusions S may not be formed on an end surface of the anti-rotation fin 240 that faces toward the anti-rotation surface 120. However, the contact protrusions S may be formed on the anti-rotation surface 120 to prevent relative rotation of the rotor core 200.

The rotor core 200 according to the second embodiment of the present disclosure includes the contact protrusions S on the cooling fin 230, thereby increasing the area of contact with the cooling fluid, compared to the rotor core 200 according to the first embodiment of the present disclosure. Accordingly, the rotor core 200 according to the second embodiment may increase the amount of heat transferred, which in turn improves cooling efficiency.

Referring to FIGS. 11 and 12, in the case of the rotor core 200 according to the third embodiment of the present disclosure, flow passage fins 250 may have a smaller thickness than an anti-rotation fin 240 in the second direction.

Specifically, the anti-rotation fin 240 may have, in the second direction, a thickness sufficient to make contact with an anti-rotation surface 120 and perform prevention of rotation. The flow passage fins 250 may have a small thickness in the second direction so as to increase the surface area of a rotor cooling channel P to the maximum. For example, first flow passage fins 251 and second flow passage fins 252 may be formed in a thin plate shape.

Accordingly, the rotor core 200 according to the third embodiment of the present disclosure may increase the amount of heat transferred to a cooling fluid, thereby improving cooling efficiency.

Meanwhile, the present disclosure may further include end plates 300. The end plates 300 may cover one side surface and an opposite side surface of the rotor core 200 in the lengthwise direction, and the rotor shaft 100 may pass through the end plates 300.

Specifically, the end plates 300 may include a first end plate 310 that covers the one side surface of the rotor core 200 and a second end plate 320 that covers the opposite side surface of the rotor core 200.

The first end plate 310 may be provided on one side of the rotor core 200, that is, a side through which the cooling fluid is introduced. The second end plate 320 may be provided on an opposite side of the rotor core 200, that is, a side through which the cooling fluid is released. For example, the rotor cooling channel P may extend between the first end plate 310 and the second end plate 320.

The second end plate 320 may include a fluid discharge groove 321. The fluid discharge groove 321 may be provided between the rotor core 200 and the second end plate 320 and may be connected with the rotor cooling channel P such that the cooling fluid flowing through the rotor cooling channel P is discharged outside the rotor core 200.

For example, the cooling fluid hole 130 may be formed adjacent to the first end plate 310. The fluid discharge groove 321 may be formed on a surface making contact with the opposite side surface of the rotor core 200. The cooling fluid may be scattered from the rotor cooling channel P through the fluid discharge groove 321 to the outside of the rotor core 200. For example, the cooling fluid discharged from the fluid discharge groove 321 may be scattered to the inside of an end coil (not illustrated) and may additionally cool the end coil.

Hereinafter, a moving path of a cooling fluid will be described with reference to FIG. 8.

The cooling fluid may be introduced into the hollow 111 of the rotor shaft 100. The cooling fluid introduced into the hollow 111 may be introduced into the rotor cooling channel P, which is formed between the rotor core 200 and the rotor shaft 100, through the cooling fluid hole 130. The cooling fluid introduced into the rotor cooling channel P may move along the rotor cooling channel P in the first direction and may directly cool the rotor core 200.

The cooling fluid moving along the rotor cooling channel P may be scattered to the outside through the fluid discharge groove 321 formed on the second end plate 320.

As described above, in the rotor assembly and the motor including the same according to the embodiment of the present disclosure, the rotor shaft may have the anti-rotation surface formed thereon, the rotor core may have the cooling fin formed on the inner surface thereof, and the rotor cooling channel through which the cooling fluid flows may be formed between the rotor shaft and the rotor core to directly cool the rotor core in an oil cooling method. Accordingly, the cooling performance of the motor may be improved.

In addition, according to the embodiment of the present disclosure, the cooling fin may prevent rotation of the rotor core, and the fin shape of the cooling fin may increase the flow passage area of the rotor cooling channel to increase the amount of heat transferred, thereby improving the cooling performance of the rotor core.

The rotor assembly and the motor including the same according to the embodiment of the present disclosure may directly cool the rotor core in an oil cooling method by forming the rotor cooling channel, through which the cooling fluid flows, between the rotor shaft and the rotor core by forming the anti-rotation surface on the rotor shaft and the cooling fin on the inner surface of the rotor core. Accordingly, the cooling performance of the motor may be improved.

In addition, according to the embodiment of the present disclosure, the rotor assembly and the motor including the same may prevent rotation of the rotor core using the cooling fin and may improve the cooling performance of the rotor core by increasing the amount of transferred heat by increasing the flow passage area of the rotor cooling channel using the fin-shape of the cooling fin.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A rotor assembly comprising:
a rotor core having a through-hole formed through a central portion thereof in an axial direction of the rotor core; and
a rotor shaft coupled to the rotor core through the through-hole, the rotor shaft having a hollow into which a cooling fluid is introduced,
wherein a cooling fin protrudes from an inner circumferential surface of the rotor core toward the rotor shaft to form, between the rotor core and the rotor shaft, a rotor cooling channel through which the cooling fluid flows,
wherein the rotor shaft includes:
a shaft body having the hollow formed therein;
at least one anti-rotation surface formed in a planar shape on at least part of an outer surface of the shaft body; and
a cooling fluid hole penetrating through the shaft body and connecting the hollow and the at least one anti-rotation surface to each other, the cooling fluid hole being formed on the at least one anti-rotation surface, and
wherein the cooling fin is formed in a position corresponding to the at least one anti-rotation surface,
wherein a lengthwise direction of the at least one anti-rotation surface is referred to as a first direction, and a widthwise direction of the at least one anti-rotation surface is referred to as a second direction, the second direction being perpendicular to the first direction, and
wherein the cooling fin includes:
an anti-rotation fin having an end portion configured to face toward the at least one anti-rotation surface and make direct contact with the at least one anti-rotation surface; and
a flow passage fin spaced apart from the anti-rotation fin in the second direction and spaced apart from the at least one anti-rotation surface.

2. The rotor assembly of claim 1, wherein the at least one anti-rotation surface includes a pair of anti-rotation surfaces extending along the axial direction and located on an outer circumferential surface of the shaft body to face each other, and
wherein the cooling fin extends along the axial direction.

3. The rotor assembly of claim 1, wherein the cooling fluid hole includes:
a first fluid hole; and
a second fluid hole formed in a position spaced apart from the first fluid hole in the second direction, and
wherein the anti-rotation fin is configured such that the end portion is located between the first fluid hole and the second fluid hole.

4. The rotor assembly of claim 3, wherein the flow passage fin includes:
a plurality of first flow passage fins located on one side of the anti-rotation fin in the second direction and configured to form a first cooling channel connected with the first fluid hole; and
a plurality of second flow passage fins located on an opposite side of the anti-rotation fin in the second direction and configured to form a second cooling channel connected with the second fluid hole.

5. The rotor assembly of claim 1, wherein each of the anti-rotation fin and the flow passage fin includes a contact protrusion having a spline shape formed on at least part of outer surfaces thereof, the contact protrusion having multiple ridges and valleys.

6. The rotor assembly of claim 5, wherein the contact protrusion extends in the first direction, and a cross-section of the contact protrusion that is perpendicular to the at least one anti-rotation surface has a triangular saw tooth shape.

7. The rotor assembly of claim 1, wherein the flow passage fin has a thickness smaller than a thickness of the anti-rotation fin in the second direction.

8. The rotor assembly of claim 1, further comprising:
end plates configured to cover one side surface and an opposite side surface of the rotor core in the axial direction, wherein the rotor shaft passes through the end plates.

9. The rotor assembly of claim 8, wherein the end plates include:
a first end plate configured to cover the one side surface of the rotor core; and
a second end plate configured to cover the opposite side surface of the rotor core.

10. The rotor assembly of claim 9, wherein the second end plate has a fluid discharge groove formed thereon, the fluid discharge groove being located between the rotor core and the second end plate and connected with the rotor cooling channel such that the cooling fluid flowing through the rotor cooling channel is discharged outside the rotor core.

11. A motor comprising:
a housing;
a stator disposed in the housing; and
a rotor assembly received inside the stator so as to be rotatable,
wherein the rotor assembly includes:
a rotor core having a through-hole formed through a central portion thereof in an axial direction of the rotor core; and
a rotor shaft coupled to the rotor core through the through-hole, the rotor shaft having a hollow into which a cooling fluid is introduced, and
wherein the rotor core includes a cooling fin protruding from an inner circumferential surface thereof to form, between the rotor core and the rotor shaft, a rotor cooling channel through which the cooling fluid flows,
wherein the rotor shaft includes:
a shaft body having the hollow formed therein;
at least one anti-rotation surface formed in a planar shape on at least part of an outer surface of the shaft body; and
a cooling fluid hole penetrating through the shaft body and connecting the hollow and the at least one anti-rotation surface to each other, the cooling fluid hole being formed on the at least one anti-rotation surface, and
wherein the cooling fin is formed in a position corresponding to the at least one anti-rotation surface,
wherein a lengthwise direction of the at least one anti-rotation surface is referred to as a first direction, and a widthwise direction of the at least one anti-rotation surface is referred to as a second direction, the second direction being perpendicular to the first direction, and
wherein the cooling fin includes:
an anti-rotation fin having an end portion configured to face toward the at least one anti-rotation surface and make direct contact with the at least one anti-rotation surface; and
a flow passage fin spaced apart from the anti-rotation fin in the second direction and spaced apart from the at least one anti-rotation surface.

12. A rotor assembly comprising:
a rotor core having a through-hole formed through a central portion thereof in an axial direction of the rotor core; and
a rotor shaft coupled to the rotor core through the through-hole, the rotor shaft having a hollow into which a cooling fluid is introduced,
wherein a cooling fin protrudes from an inner circumferential surface of the rotor core toward the rotor shaft to form, between the rotor core and the rotor shaft, a rotor cooling channel through which the cooling fluid flows,
wherein the cooling fin includes a plurality of fins having different radial lengths from each other.

* * * * *